United States Patent
Shi et al.

(10) Patent No.: US 8,478,570 B2
(45) Date of Patent: Jul. 2, 2013

(54) METHOD AND APPARATUS FOR ESTABLISHING NETWORK PERFORMANCE MODEL

(75) Inventors: Guangyu Shi, Shenzhen (CN); Youshui Long, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 834 days.

(21) Appl. No.: 12/140,711

(22) Filed: Jun. 17, 2008

(65) Prior Publication Data
US 2009/0089036 A1    Apr. 2, 2009

(30) Foreign Application Priority Data
Sep. 28, 2007    (CN) .......................... 2007 1 0151586

(51) Int. Cl.
*G06F 17/10* (2006.01)

(52) U.S. Cl.
USPC .......................................................... 703/2

(58) Field of Classification Search
USPC .......................................................... 703/2
See application file for complete search history.

(56) References Cited

U.S. PATENT DOCUMENTS

| | | | |
|---|---|---|---|
| 6,484,206 B2 | 11/2002 | Crump et al. | |
| 6,735,553 B1 | 5/2004 | Frogner et al. | |
| 7,590,513 B2 * | 9/2009 | Jiang et al. | 703/2 |
| 2003/0018601 A1 * | 1/2003 | Lee et al. | 706/45 |
| 2003/0097294 A1 * | 5/2003 | Gordon | 705/10 |
| 2006/0126529 A1 | 6/2006 | Hardy | |
| 2006/0136417 A1 * | 6/2006 | Avinash et al. | 707/9 |

FOREIGN PATENT DOCUMENTS

| | | |
|---|---|---|
| CN | 1547357 A | 11/2004 |
| CN | 1614941 A | 5/2005 |
| CN | 1870545 A | 11/2006 |
| CN | 101026502 A | 8/2007 |
| CN | 101043384 A | 9/2007 |
| WO | 0110082 A2 | 2/2001 |

OTHER PUBLICATIONS

David M. Blei et al., "Latent Dirichlet Allocation", 2003, Journal of Machine Learning research, vol. 3, pp. 993-1022.*
Haizheng Zhang et al., "An LDA-based Community Structure Discovery Approach for Large-Scale Social Networks", May 23, 2007, 2007 IEEE Intelligence and Security Informatics, pp. 200-207.*
Sholom M. Weiss et al., "Predictive Data Mining a practical guide", 1998, Morgan Kaufmann Publishers, pp. vii, 101-102.*
English translation of the Written Opinion of the International Searching Authority for International Application No. PCT/CN2007/071279, dated Jul. 3, 2008.

* cited by examiner

*Primary Examiner* — Dwin M Craig
*Assistant Examiner* — Russ Guill
(74) *Attorney, Agent, or Firm* — Slater & Matsil, L.L.P.

(57) ABSTRACT

A method and apparatus for establishing a network performance model. The method includes: determining, according to performance data provided by network nodes and the probability of the performance data, a parameter α showing the correlation of the performance data of different network nodes in a whole network and a parameter β showing the distribution pattern of the performance data in the network; and establishing a Latent Dirichlet Allocation, LDA, network performance model by using the determined parameter α and the parameter β.

10 Claims, 4 Drawing Sheets

METHOD AND APPARATUS FOR ESTABLISHING NETWORK PERFORMANCE MODEL

CROSS-REFERENCE TO RELATED APPLICATIONS

This application claims the benefit of Chinese Application No. 200710151586.1, filed Sep. 28, 2007. The disclosure of the above application is incorporated herein by reference.

FIELD

The present disclosure relates to computer network technologies, and particularly to a method and apparatus for establishing a network performance model.

BACKGROUND

The statements in this section merely provide background information related to the present disclosure and may not constitute prior art.

As the network technologies develop rapidly, the number of users and new services keeps on expanding, and network operators have to try to provide the best services for users to survive in the market full of intense competition. Therefore, network performance has become the focus in such a circumstance. In practical applications, an operator usually needs to run network environment simulation to evaluate the network performance for network planning, optimization and Quality of Service (QoS) control. According to the operation principles of actual networks, network performance model can be established in a network environment simulation, and an actual network environment can be simulated by using the established network performance model.

The network performance model in the existing technology is the Gaussian mixture model. The basic process of establishing a Gaussian mixture model includes firstly a step of providing performance data by a part of network nodes in a network. The performance data is described with plurality of components which affect the performance data. Each of the components is in compliance with Gaussian distribution. Therefore the components are generally called Gaussian components. The performance data in the established Gaussian mixture model equals the total weights of all Gaussian components. Suppose a piece of performance data is described with N Gaussian components, the Gaussian distribution mean value of the No. j Gaussian component is $\mu_j$, the deviation of the Gaussian component is $\sigma_j^2$ and the mixture weight value of the Gaussian component is $\omega_j$, the probability density function of the performance data is $$p(s \mid \theta) = \sum_{j=1}^{N} \omega_j N_s(\mu_j, \sigma_j^2).$$

Wherein $\theta=(\omega_j,\mu_j,\sigma_j^2)$ and s is the performance data. The probability density function shows the probability density of the performance data when the Gaussian components of the performance data are determined. A matrix can be obtained with performance data on rows and Gaussian components on columns. A value in the matrix is the probability density corresponding to the performance data of the corresponding row and the Gaussian component of the corresponding column. Therefore the matrix shows the distribution of the Gaussian components of all measured performance data. A simulation environment can be established with the matrix as the parameters of the network performance model.

However, when the Gaussian mixture model is used as the network performance model, the Gaussian component weights are derived solely from sample performance data provided by the network nodes, i.e., the network performance model is established for the network nodes that provided the performance data and is reliable only in showing the performance of the network nodes. The performance data of other network nodes in the network are not shown in the network performance model, which means the network performance model established with the conventional method is not suitable to the whole network and is not reliable in showing the performance of the whole network. In one sentence, the network performance model does not fit the whole network consisting of network nodes of same aggregation features, and nodes providing the performance data can be chosen at random from the aggregation space.

SUMMARY

The present disclosure provides a method and apparatus for establishing a network performance model which is reliable in showing the performance of a whole network. The method for establishing a network performance model includes:

determining, according to performance data provided by network nodes and the probability of the performance data, a parameter $\alpha$ showing the correlation of the performance data of different network nodes in a whole network and a parameter $\beta$ showing the distribution pattern of the performance data in the network; and establishing a Latent Dirichlet Allocation, LDA, network performance model by using the determined parameter $\alpha$ and the parameter $\beta$.

The apparatus for establishing a network performance model includes:

a parameter determining unit, adapted to determine, according to performance data provided by network nodes and the probability of the performance data, a parameter $\alpha$ showing the correlation of the performance data of different network nodes in a whole network and a parameter $\beta$ showing the distribution pattern of the performance data in the network; and a model establishing unit, adapted to establish a Latent Dirichlet Allocation, LDA, network performance model by using the parameter $\alpha$ and parameter $\beta$ determined by the parameter determining unit.

It can be seen from the technical scheme that the method and apparatus provided by embodiments of the present disclosure can determine a parameter $\beta$ showing the distribution pattern of the performance data in the whole network according to the performance data provided by network nodes and can further determine a parameter $\alpha$ showing the correlation of the performance data of different network nodes in the whole network. The combination of the determined parameters $\alpha$ and $\beta$ shows the distribution pattern of the performance data of different network nodes in the network. The distribution pattern is key factor used for establishing the network performance model. The network performance model established by using the present disclosure is not only reliable in showing the performance of the network nodes that provide the performance data, but also fits other network nodes in the network and is thus reliable in showing the performance of the whole network.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Reference throughout this specification to "one embodiment," "an embodiment," "specific embodiment," or the like in the singular or plural means that one or more particular features, structures, or characteristics described in connection with the embodiment is included in at least one embodiment of the present disclosure. Thus, the appearances of the phrases "in one embodiment" or "in an embodiment," "specific embodiment," or the like in the singular or plural in various places throughout this specification are not necessarily all referring to the same embodiment. Furthermore, the particular features, structures, or characteristics may be combined in any suitable manner in one or more embodiments.

In order to make the objective, technical scheme and merits more apparent, a detailed description is hereinafter given with reference to specific embodiments and accompanying drawings.

A method in embodiments mainly includes: determining, according to performance data provided by network nodes and the probability of the performance data, a parameter α showing the correlation of the performance data of different network nodes in a whole network and a parameter β showing the distribution pattern of the performance data in the network; and establishing a Latent Dirichlet Allocation (LDA) network performance model by using the determined parameter α and parameter β.

The method may further include: generating simulated performance data for network nodes in the network by using the established LDA network performance model and eventually establishing a network performance simulation circumstance.

Figure 1:
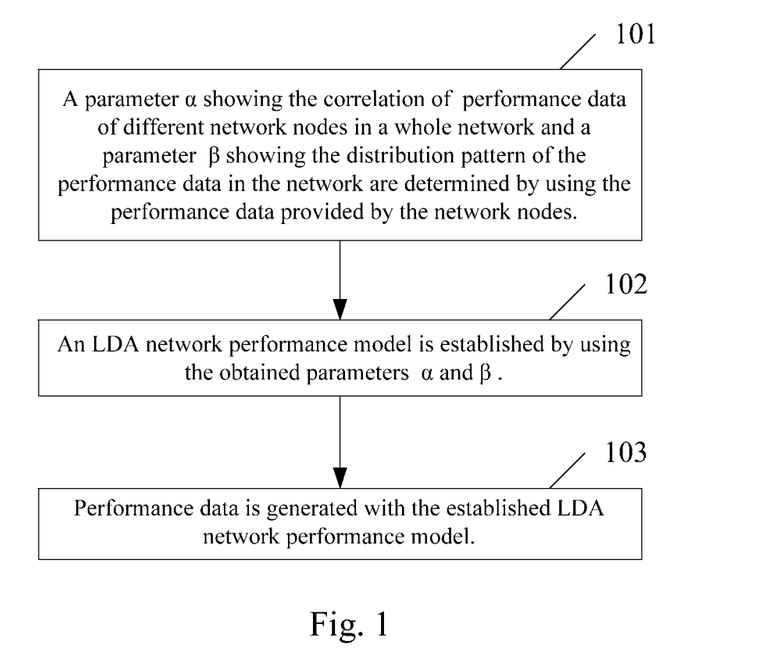
FIG. 1 is a simplified flow chart of a method for establishing a network model according to an embodiment.

FIG. 1 is a simplified flow chart of a method for establishing a network model according to an embodiment. As shown in FIG. 1, the method mainly includes the following processes.

Block 101: A parameter α showing the correlation of performance data of different network nodes in a whole network and a parameter β showing the distribution pattern of the performance data in the network are determined by using the performance data provided by the network nodes.

In this process, the performance data collected by the network nodes may be bandwidth, delay or other performance data.

Besides, the collected performance data can be further processed to reduce the sample space and the processed performance data shall be used as sample data. The processing may include: reducing the accuracy of the performance data by rounding the performance data when the accuracy of the collected performance data is too high, e.g., rounding 5.21 to 5. When the scope of the collected performance data is too broad, the collected performance data is divided into different blocks, e.g., using 1 to indicate [0,10) and using 2 to indicate [10,20).

In this process, the correlation of the performance data of the network nodes in the network is obtained from the performance data provided by a part of the network nodes, and the distribution pattern of the performance data is further obtained accordingly. Therefore the distribution pattern of the performance data of all network nodes in the network may be obtained.

In this process, the parameters α and β are determined when the performance data occurs with the maximum probability. The determination can be made with the maximum likelihood approach or other approaches.

Figure 2:
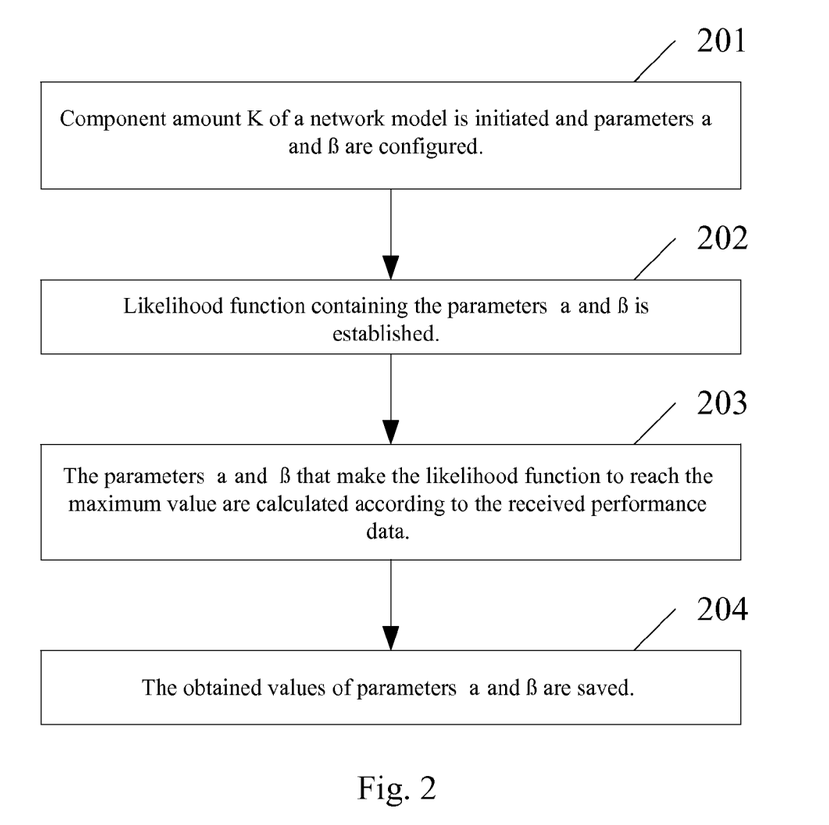
FIG. 2 is a simplified flow chart of a method for estimating parameters α and β by using the maximum likelihood approach according to an embodiment.

The flow chart shown in FIG. 2 can be used for the determination. In this embodiment, the maximum likelihood approach is used for estimating parameters α and β. As shown in FIG. 2, the process of estimating the parameters α and β is described as follows.

Block 201: Component amount K of a network model is initiated and parameters α and β are configured.

In this process, K indicates that the correlation of the network nodes in the network is determined by K factors and K≧2. The value of K is usually determined according to experience. α is the parameter of K dimension and β is the parameter of K×V dimension. Wherein, V indicates the sample space of the received performance data of the network nodes. Normally the initial value of the parameter α is 1 and the initial value of the parameter β is 0.

Block 202: Likelihood function containing the parameters α and β is established.

The likelihood function l(α,β) established in this process can be:

$$l(\alpha, \beta) = \sum_{d=1}^{M} \log p(w_d \mid \alpha, \beta). \quad (1)$$

M is the number of network nodes chosen to provide performance data and $w_d$ is the performance data sent from No. d network node. The likelihood function l(α,β) also contains latent internal variables θ and $Z_d$. θ indicates the distribution pattern of the performance data of different network nodes and complies with Dirichlet distribution Dir(α). Both θ and α are parameters of K dimension.

$$Dir(\alpha) = \frac{1}{B(\alpha)} \sum_{i=1}^{K} x_i^{\alpha_i-1} = \frac{\Gamma\left(\sum_{i=1}^{K} \alpha_i\right)}{\prod_{i=1}^{K} \Gamma(\alpha_i)} \prod_{i=1}^{K} x_i^{\alpha_i-1} \quad (2)$$

$Z_d$ indicates the distribution pattern of the performance data of the No. d network node and complies with multinomial distribution Multinomial($\theta$), and the probability of $w_d$ with parameters $Z_d$ and $\beta$ is $p(w_d|Z_d,\beta)$.

Block 203: The parameters $\alpha$ and $\beta$ that make the likelihood function to reach the maximum value are calculated according to the received performance data.

Because the likelihood function $l(\alpha,\beta)$ established in Block 202 shows the probability of $w_d$ when the correlation of the performance data of network nodes equals parameters, and the distribution pattern of the performance data of the network nodes equals parameters. Therefore, the parameters $\alpha$ and $\beta$ that allow the likelihood function $l(\alpha,\beta)$ to reach the maximum value equal the parameters $\alpha$ and $\beta$ when the $w_d$ reach the maximum value.

Because the calculation for $p(w_d|\alpha,\beta)$ in Equation (1) is complicated, variational inference can be employed to simplify the calculation of parameters $\alpha$ and $\beta$. The simplified calculation is given as below:

$$\log p(w_d \mid \alpha, \beta) = \log \int \sum_{Z_d} p(\theta, Z_d, w_d \mid \alpha, \beta) d\theta \quad (3)$$

$$= \log \int \sum_{z_d} q(\theta, Z_d \mid \gamma, \varphi) \cdot \frac{p(\theta, Z_d, w_d \mid \alpha, \beta)}{q(\theta, Z_d \mid \gamma, \varphi)} d\theta$$

$$\geq \int \sum_{z_d} q(\theta, Z_d \mid \gamma, \varphi) \log \frac{p(\theta, Z_d, w_d \mid \alpha, \beta)}{q(\theta, Z_d \mid \gamma, \varphi)} d\theta.$$

Figure 3A:
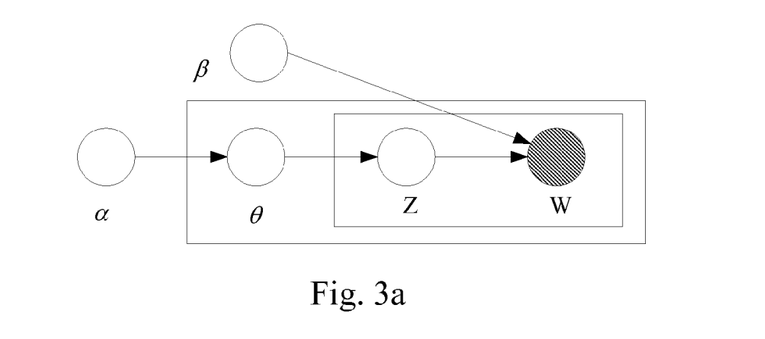
FIG. 3a is an internal structure scheme of an LDA model according to an embodiment before an intermediate variable is introduced.
Figure 3B:
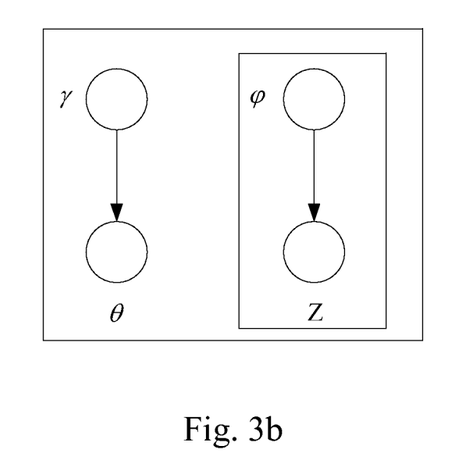
FIG. 3b is an internal structure scheme of an LDA model according to an embodiment after an intermediate variable is introduced.

In the calculation, $\gamma$ and $\phi$ are intermediate variables introduced into the variational inference. $\gamma$ is a parameter of K dimension and $\phi$ is a parameter of K×V dimension. Similarly, q is also an introduced intermediate function and $E_q$ indicates the expected value of the function q. FIG. 3a shows an internal structure of an LDA model before introducing intermediate variables and FIG. 3b shows an internal structure of an LDA model after introducing intermediate variables.

In Equation (3), the difference between the left and the right of the sign of inequality is divergence K-L:

$$D(q(\theta, Z \mid \gamma, \varphi) \| p(\theta, z \mid w, \alpha, \beta)) = \log p(w_d \mid \alpha, \beta) - \quad (4)$$

$$\int \sum_{z} q(\theta, Z_d \mid \gamma, \varphi) \log \frac{p(\theta, Z_d, w_d \mid \alpha, \beta)}{q(\theta, Z_d \mid \gamma, \varphi)} d\theta =$$

$$\log p(w_d \mid \alpha, \beta) -$$

$$(E_q[\log p(\theta, Z_d, w_d \mid \alpha, \beta)] - E_q[\log q(\theta, Z_d \mid \gamma, \varphi)]$$

It can be learnt from Equation (4) that:

$\log p(w_d|\alpha,\beta) = E_q[\log p(\theta,Z_d|w_d|\alpha\beta)]E_q[\log q(\theta,Z_d|\gamma,\phi)] + D(q(\theta,Z_d|\gamma,\phi)\|p_{(\theta,}Z_d|w_d,\alpha,\beta))$.

It can be learnt from the property of the divergence K-L that $D(q(\theta,Z_d|\gamma,\phi)\|p(\theta,Z_d|w_d,\alpha,\beta)) \geq 0$. Therefore when $E_q[\log p(\theta,Z_d,w_d|\alpha,\beta)]-E_q[\log q(\theta,Z_d|\gamma,\phi)]$ reaches the maximum value, $\log p(w_d|\alpha,\beta)$ also reaches the maximum value.

$$L(\gamma, \varphi, \alpha, \beta) = E_q[\log p(\theta, Z_d, w_d \mid \alpha, \beta)] - E_q[\log q(\theta, Z_d \mid \gamma, \varphi)] = \quad (5)$$

$$E_q[\log p(\theta \mid \alpha)] + E_q[\log p(Z_d \mid \theta)] +$$

$$E_q[\log p(w_d \mid Z_d, \beta)] - E_q[\log q(\theta \mid \gamma)] - E_q[\log q(Z_d \mid \varphi)] =$$

$$\log \Gamma\left(\sum_{j=1}^{k} \alpha_j\right) - \sum_{i=1}^{k} \log \Gamma(\alpha_i) + \sum_{i=1}^{k} (\alpha_i - 1)\left(\Psi(\gamma_i) - \Psi\left(\sum_{j=1}^{k} \gamma_j\right)\right) +$$

$$\sum_{n=1}^{N} \sum_{i=1}^{k} \varphi_{ni}\left(\Psi(\gamma_i) - \Psi\left(\sum_{j=1}^{k} \gamma_j\right)\right) +$$

$$\sum_{n=1}^{N} \sum_{i=1}^{k} \varphi_{ni} w_n^j \log \beta_{ij} - \log \Gamma\left(\sum_{j=1}^{k} \gamma_j\right) + \sum_{i=1}^{k} \log \Gamma(\gamma_i) -$$

$$\sum_{i=1}^{k} (\gamma_i - 1)\left(\Psi(\gamma_i) - \Psi\left(\sum_{j=1}^{k} \gamma_j\right)\right) - \sum_{n=1}^{N} \sum_{i=1}^{k} \varphi_{ni} \log \varphi_{ni}$$

The maximum value of Formula (5) is the extremum of Formula (5) with $\gamma$ and $\phi$ as independent variables. When the values of parameters $\alpha$ and $\beta$ are known variables, the optimized values of parameters $\gamma$ and $\phi$ are:

$$\varphi_{ni} \propto \beta_{iv} \exp\left(\Psi(\gamma_i) - \Psi\left(\sum_{j=1}^{k} \gamma_j\right)\right) \gamma_i = \alpha_i + \sum_{n=1}^{N} \varphi_{ni}. \quad (6)$$

The values of parameters $\gamma$ and $\phi$, i.e., the values of all $\gamma_i$ and $\phi_{ni}$ Formulation (6), are calculated through iteration with initial values of parameters $\alpha$ and $\beta$.

The obtained values of parameters $\gamma$ and $\phi$ are used in the likelihood function of Equation (1):

$$l(\alpha, \beta) = \sum_{d=1}^{M} \log p(w_d \mid \alpha, \beta).$$

log $p(w_d|\alpha,\beta)$ is replaced with $L(\gamma,\phi,\alpha,\beta)$ of Equation (5). Taking the parameters $\alpha$ and $\beta$ as independent variables, the extremum of $L(\gamma,\phi,\alpha,\beta)$ is calculated and therefore:

$$\beta_{ij} \propto \sum_{d=1}^{M} \sum_{n=1}^{N_d} \varphi_{dn_i}^* w_{dn}^j; \quad (7)$$

$$L(\alpha) = \sum_{d=1}^{M} \left( \log \Gamma\left(\sum_{j=1}^{K} \alpha_j\right) - \right. \quad (8)$$

$$\left. \sum_{i=1}^{K} \log \Gamma(\alpha_i) + \sum_{i=1}^{K} \left((\alpha_i - 1)\left(\Psi(\gamma_{d_i}) - \Psi\left(\sum_{j=1}^{K} \gamma_{d_j}\right)\right)\right)\right);$$

The value of the parameter $\beta$ is calculated by calculating Formulation (7) with the obtained parameters $\gamma$ and $\phi$ as variables. The value of parameter $\alpha$ can be obtained by calculating the extremum of Formulation (8) with parameter $\alpha$ as the variable. The extremum of Formulation (8) can be calculated with the Newton-Raphson method.

Preferably, Blocks 201 to 203 are repeated with the obtained parameters $\alpha$ and $\beta$ as initial variables to calculate the values of parameters γ and φ again and further to calculate the values of parameters α and β again. Then Blocks 201 to 203 are repeated for the second time with the values of parameters α and β obtained in the preceding repeated processes as the initial variables. The Blocks are repeated again and again until the values of parameters α and β show convergence, the convergent values of parameters α and β shall be taken as the final values of parameters α and β.

Block 204: The obtained values of parameters α and β are saved.

The saved parameters α and β are taken as the initial parameters α and β in the iteration calculation for establishing a network performance model next time.

Block 102: An LDA network performance model is established by using the obtained parameters α and β.

In this process, the LDA network performance model is established by using the parameters α and β to calculate the internal variables of the LDA model. The internal variable θ complies with Dir(α) distribution, i.e., $$p(\theta \mid \alpha) = \frac{\Gamma\left(\sum_{i=1}^{K} \alpha_i\right)}{\prod_{i=1}^{K} \Gamma(\alpha_i)} \theta_1^{\alpha_1 - 1} \theta_2^{\alpha_2 - 1} \ldots \theta_K^{\alpha_K - 1}.$$

For the No. d node, the $Z_d$ shall comply with Multinomial(θ) distribution and d∈V.

When the network performance model is established, the following processes can be performed with the established network performance model.

Block 103: Performance data is generated with the established LDA network performance model.

Because the parameter α in the established LDA model shows the correlation of the performance data of the network nodes in the network and the parameter β shows the distribution pattern of the performance data, the LDA model including the combination of the parameters α and β can show the performance of the whole network.

In this process, suppose the simulated performance data $\{w_1, w_2, \ldots, w_n, \ldots, w_N\}$ of a network node need to be generated with the established LDA network performance model, the generation of the simulated performance data includes: selecting N as the amount number of the simulated performance data generated by the No. d network node, wherein N complies with Poisson distribution; making, by using the determined parameter α, θ to comply with Dir(α) distribution, i.e., $$p(\theta \mid \alpha) = \frac{\Gamma\left(\sum_{i=1}^{K} \alpha_i\right)}{\prod_{i=1}^{K} \Gamma(\alpha_i)} \theta_1^{\alpha_1 - 1} \theta_2^{\alpha_2 - 1} \ldots \theta_K^{\alpha_K - 1};$$

making $Z_{dn}$, which corresponds to $w_{dn}$, to comply with Multinomial(θ) distribution; making $w_{dn}$ to satisfy $p(w_{dn} \mid Z_{dn}, \beta)$; and repeating the above processes so that the simulated performance data of multiple network nodes can be generated by the LDA network performance model. In these processes, $w_d$, is the No. n simulated performance data of the No. d network node and $Z_{dn}$ indicates the distribution pattern of the No. n simulated performance data of the No. d network node.

The established LDA model shows the performances of all network nodes in the whole network. Therefore the simulated performance data generated in Block 103 can be the simulated performance data of the network nodes that provide performance data in Block 101, or be simulated performance data provided by other network nodes in the network.

A network performance simulation environment can be established with the simulated performance data of network nodes generated in Block 103.

The simulated performance data generated in Block 103 for the network nodes are assigned to the network nodes in the simulation environment. When the simulated performance data includes the delays and bandwidths of the network nodes, the simulated performance data shall be assigned to the network nodes in the simulation environment as the delays and bandwidths of the network nodes to establish a simulation environment which has the same distribution pattern as the real network. For example, when a simulation environment embodying the delays of the network nodes is needed, the parameter α that shows the correlation of the performance data of the network nodes in the network and the parameter β that shows the distribution pattern of performance data are determined according to the delay data provided by a part of the network nodes in the network and the probability of the delay data. An LDA model is established with the determined parameters α and β. Simulated delay data of all network nodes in the network are generated with the established LDA model and the network performance simulation environment is eventually established with the simulated delay data of all network nodes. Tests can be run in the simulation environment to offer evidences for optimization and QoS control of the real network.

Figure 3C:
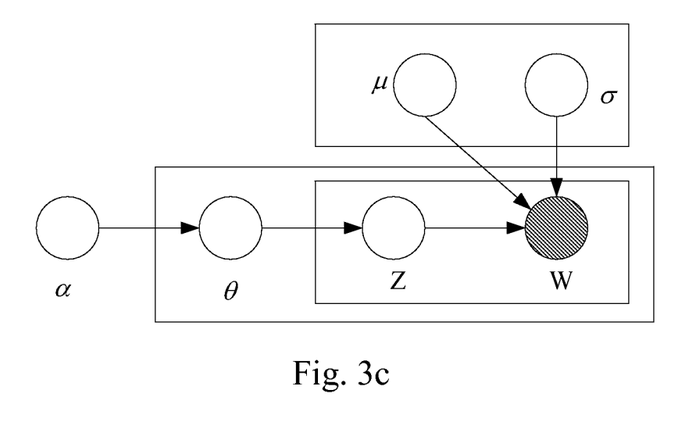
FIG. 3c is an internal structure scheme of an LDA model according to an embodiment with Gaussian distribution introduced.

Furthermore, in the flow shown in FIG. 2, given the parameters Z and β, $w_d$ may also comply with Gaussian distribution. Therefore the $p(w_d \mid Z_d, \beta)$ in the preceding processes can be replaced with Gaussian distribution. The calculation of the parameters α and β may still adopt the corresponding method in FIG. 2 as long as certain changes of the parameters are made, i.e., the parameter β is changed into $2 \times K \times K_s$. $K_s$ is the number of Gaussian components; the Gaussian distribution has parameters μ and σ and the internal structure of corresponding LDA model is shown in FIG. 3c. The detailed calculation will not be described any further herein.

Figure 4:
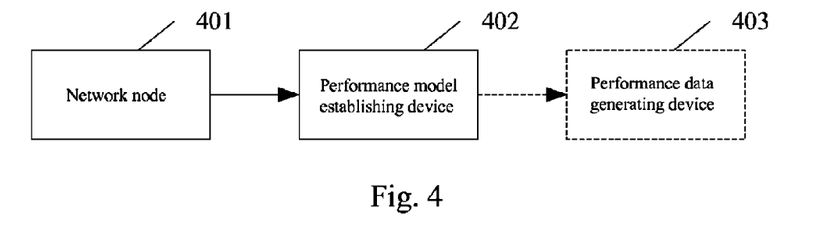
FIG. 4 is a structure scheme of a system for establishing a network performance model according to an embodiment.

FIG. 4 is a structure scheme of a system for establishing a network performance model according to an embodiment. As shown in FIG. 4, the system includes: network node 401 and performance model establishing device 402.

Network node 401 is adapted to provide performance data of the network node itself.

Performance model establishing device 402 is adapted to determine, according to the performance data provided by network node 401 and the probability of the performance data, the parameter α that shows the correlation of performance data of network nodes and the parameter β that shows the distribution pattern of the performance data in the network, and establish an LDA network performance model with the established parameters α and β.

The system may further include: performance data generating device 403, adapted to generate performance data by using the network performance model established at performance model establishing device 402.

Performance data generating device 403 can be a standalone device or be integrated into performance model establishing device 402.

Figure 5:
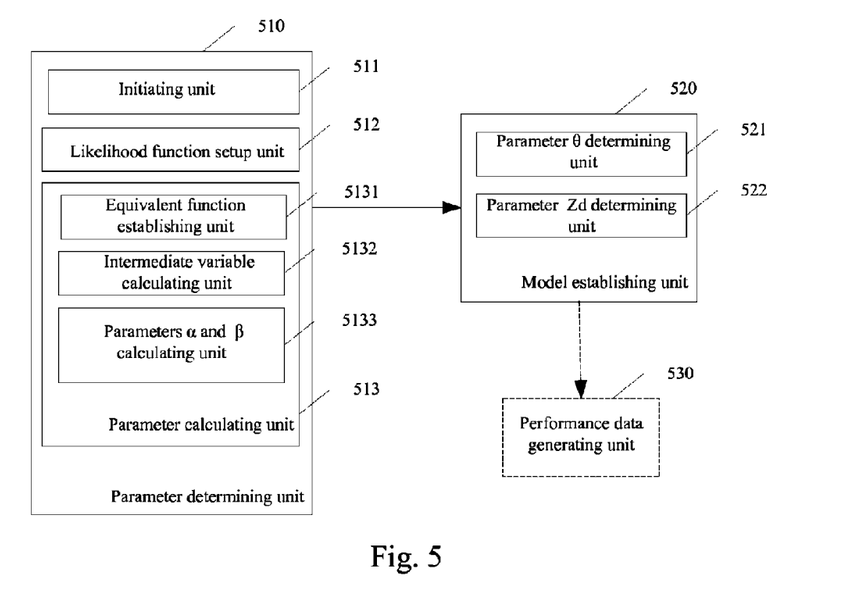
FIG. 5 is a structure scheme of an apparatus for establishing a network performance model in accordance with an embodiment.

A structure of performance model establishing device 402 is shown in FIG. 5, mainly including: parameter determining unit 510 and model establishing unit 520.

Parameter determining unit 510 is adapted to determine, according to performance data provided by network nodes and the probability of the performance data, a parameter α showing the correlation of the performance data of different network nodes and a parameter β showing the distribution pattern of the performance data in the network.

Model establishing unit 520 is adapted to establish a LDA network performance model by using the parameter α and the parameter β determined by parameter determining unit 510.

The device may further include: performance data generating unit 530, adapted to generate the performance data by using the network performance model established by model establishing unit 520.

Parameter determining unit 510 may further include: initiating unit 511, likelihood function setup unit 512 and parameter calculating unit 513.

Initiating unit 511 is adapted to initiate component number K of the network performance model.

Likelihood function setup unit 512 is adapted to establish a likelihood function $l(\alpha,\beta)$ of the parameters α and β according to the component number K from the initiating unit 511. The parameter α is a parameter of K dimension, the parameter β is a parameter of K×V dimension and V indicates the sample space of the performance data.

Parameter calculating unit 513 is adapted to calculate, according to the performance data from network nodes, the values of the parameters α and β that allow the likelihood function $l(\alpha,\beta)$ established at likelihood function setup unit 512 to reach the maximum value.

Parameter calculating unit 513 may further include: equivalent function establishing unit 5131, intermediate variable calculating unit 5132 and parameters α and β calculating unit 5133.

Equivalent function establishing unit 5131 is adapted to introduce intermediate parameters γ and φ into the likelihood function $l(\alpha,\beta)$ established at likelihood function setup unit 512 to obtain a simplified equivalent function $L(\gamma,\phi,\alpha,\beta)$ of the likelihood function $l(\alpha,\beta)$. γ is a parameter of K dimension and φ is a parameter of K×V dimension.

Intermediate variable calculating unit 5132 is adapted to calculate, with the parameters α and β as the known variables and the parameters γ and φ as the independent variables, the optimized values of the parameters γ and φ by calculating the extremum of the simplified equivalent function $L(\gamma,\phi,\alpha,\beta)$ established by equivalent function establishing unit 5131.

Parameters α and β calculating unit 5133 is adapted to use the optimized values of the parameters γ and φ from intermediate variable calculating unit 5132 in the simplified equivalent function $L(\gamma,\phi,\alpha,\beta)$ and calculate the extremum of the simplified equivalent function $L(\gamma,\phi,\alpha,\beta)$ with the parameters α and β as the independent variables, and eventually obtain the values of the parameters α and β.

Model establishing unit 520 may further include: parameter θ determining unit 521, adapted to determine, according to the parameters α and β determined by parameter determining unit 510, the $Dir(\alpha)$ distribution with which the internal variable θ of the LDA model complies; and Parameter $Z_d$ determining unit 522, adapted to determine, according to the parameters α and β determined by parameter determining unit 510, the $Multinomial(\theta)$ distribution with which the internal variable $Z_d$ of the LDA model complies.

It can be seen from the preceding description that the method and apparatus provided by embodiments for establishing the network performance model can determine, according to the performance data provided by network nodes and the probability of the performance data, the parameter α that shows the correlation of the performance data of network nodes and the parameter β that shows the distribution pattern of the performance data in the network, and can further establish an LDA network performance model as the network performance model with the established parameters α and β. According to the received performance data, the method in embodiments not only can determine the parameter β that shows the distribution pattern of the performance data, but also the parameter α that shows the correlation of the performance data of the network nodes in the network. Therefore the distribution pattern of the performance data of all network nodes in the whole network can be obtained by using the parameters α and β. The distribution pattern of the performance data of all network nodes in the whole network is the basis of the network performance model and enables to the network performance model to reliably show the performance of the network nodes that provides the performance data as well as the performance of all other network nodes in the whole network, i.e., to be reliable in showing the performance of the whole network.

The variational inference in combination with the maximum likelihood approach is employed in embodiments to determine the values of the parameters α and β that correspond to the maximum probability of the performance data. Therefore the simulation environment established by the network performance model will be closer to the performance of the actual network while the calculation of the parameters α and β is simpler and requires less data to be processed.

The above are only exemplary embodiments and are not for use in limiting the protection scope thereof. All the modifications, equivalent replacements or improvements in the scope, spirit, and principles of the present disclosure shall be included in the protection scope of the present disclosure.

What is claimed is:

1. A method for establishing a network performance model used for showing the performance of a computer network node, the method comprising:
    receiving, by a performance model establishing device, performance data provided by the computer network node;
    rounding, by the performance model establishing device, the performance data or dividing the performance data into blocks;
    determining, by the performance model establishing device, according to at least one of the rounded and divided performance data, the performance data being provided by the computer network node, a parameter α showing a correlation of the performance data of different computer network nodes in a whole network and a parameter β showing a distribution pattern of the performance data in the network; and
    establishing, by the performance model establishing device, a Latent Dirichlet Allocation, LDA, network performance model by using the determined parameter α and the parameter β.

2. The method of claim 1, wherein the determining the parameter α and the parameter β comprises:
    determining the parameters α and β that make the received performance data occur with the maximum probability.

3. The method of claim 2, wherein the determining the parameters α and β that make the received performance data occur with the maximum probability comprises:
    determining the parameters α and β that make the received performance data occur with the maximum probability by using the maximum likelihood approach.

4. The method of claim 3, wherein the determining the parameters α and β that make the received performance data occur with the maximum probability by using the maximum likelihood approach comprises:
- initializing a component number K of the LDA network performance model, in which K is greater than or equals to 2;
- establishing a likelihood function $l(\alpha,\beta)$ containing the parameters $\alpha$ and $\beta$ ; and
- calculating, according to the received performance data, the parameters $\alpha$ and $\beta$ that make the likelihood function $l(\alpha,\beta)$ reach the maximum value.

5. The method of claim 4, wherein the likelihood function $l(\alpha,\beta)$ containing the parameters $\alpha$ and $\beta$ is $$l(\alpha, \beta) = \sum_{d=1}^{M} \log p(w_d \mid \alpha, \beta),$$

in which
- M is the number of computer network nodes selected for sending performance data, $w_d$ is the performance data sent from the $d^{th}$ computer network node, and $p(w_d|\alpha,\beta)$ is the probability of $w_d$ occurring under conditions of the parameters $\beta$ and $\alpha$; and
- the likelihood function $l(\alpha,\beta)$ contains internal latent variables $\theta$ and $Z_d$, $\theta$ showing a distribution pattern of the performance data of the computer network node and complying with a Dirichlet distribution $Dir(\alpha)$, and $\theta$ being a parameter of K dimension; $Z_d$ showing the distribution pattern of performance data of the $d^{th}$ computer network node and complying with multinomial distribution Multinomial($\theta$); $\alpha$ a is a parameter of K dimension; when the probability of $w_d$ is $p(w_d|Z_d,\beta)$ with the parameters $\beta$ and $Z_d$, $\beta$ shall be a parameter characterized by K and V; wherein V indicates a numerical value of a sample space of performance data.

6. The method of claim 5, wherein, when the probability of $w_d$ is $p(w_d|Z_d,\beta)$ with the parameters $Z_d$ and $\beta$ the calculating of the parameters $\alpha$ and $\beta$ that make the likelihood function $l(\alpha,\beta)$ reach the maximum value further comprises:
- calculating, by using a variational inference, the parameters $\alpha$ and $\beta$ that make the likelihood function $l(\alpha,\beta)$ reach the maximum value.

7. The method of claim 6, wherein the calculating, by using a variational inference, the parameters $\alpha$ and $\beta$ that make the likelihood function $l(\alpha,\beta)$ reach the maximum value comprises:

- introducing intermediate variables $\gamma$ and $\phi$ into the likelihood function $l(\alpha,\beta)$ to obtain a simplified equivalent function $L(\gamma,\phi,\alpha,\beta)$ of the likelihood function $l(\alpha,\beta)$, in which $\gamma$ is a parameter of K dimension and $\phi$ is a parameter of K×V dimension;
- calculating, with the parameters $\alpha$ and $\beta$ as known variables and the parameters $\phi$ and $\phi$ as independent variables, optimized values of the parameters $\gamma$ and $\phi$ by calculating the extremum of the simplified equivalent function $L(\gamma,\phi,\alpha,\beta)$; and
- using the optimized values of the parameters $\gamma$ and $\phi$ in the simplified equivalent function $L(\gamma,\phi,\alpha,\beta)$, calculating the extremum of the simplified equivalent function $L(\gamma,\phi,\alpha,\beta)$ with the parameters $\alpha$ and $\beta$ as the independent variables, and obtaining the values of the parameters $\alpha$ and $\beta$ as the values of the parameters $\alpha$ and $\beta$ that make the likelihood function $l(\alpha,\beta)$ reach the maximum value.

8. The method of claim 5, wherein the establishing the LDA network performance model by using the determined parameters $\alpha$ and $\beta$ comprises:
- determining, according to the determined parameters $\alpha$ and $\beta$, the $Dir(\alpha)$ with which the internal latent variable $\theta$ complies and the multinomial distribution Multinomial($\theta$) with which the internal latent variable $Z_d$ complies.

9. The method of claim 8, further comprising:
- generating simulated performance data by using the established LDA performance model.

10. The method of claim 9, wherein the generating the simulated performance data by using the established LDA performance model comprises:
- selecting N as the amount number of performance data generated by the $d^{th}$ computer network node, wherein N complies with Poisson distribution;
- making, by using the determined parameter $\alpha$, the internal variable $\theta$ to comply with the $Dir(\alpha)$;
- making $Z_{dn}$, which corresponds to simulated performance data $w_{dn}$, to comply with the multinomial distribution Multinomial($\theta$);
- making $w_{dn}$ to comply with $p(w_n|Z_{dn},\beta)$ according to the determined parameter $\beta$ when the probability of $w_{dn}$ with the parameters $Z_{dn}$ and $\beta$ is $p(w_{dn}|Z_{dn},\beta)$; or making $w_{dn}$ to comply with Gaussian distribution when $w_{dn}$ with the parameters $Z_{dn}$ and $\beta$ complies with Gaussian distribution; wherein $w_{dn}$ is the $n^{th}$ simulated performance data of the $d^{th}$ computer network node and $Z_{dn}$ is a distribution pattern of the $n^{th}$ performance data of the $d^{th}$ computer network node.

* * * * *